July 5, 1960  J. R. WILKINSON  2,943,886
DOOR OPENING MECHANISM FOR BOTTOM DUMP VEHICLES
Filed Jan. 16, 1957  4 Sheets-Sheet 1

Inventor:
John R. Wilkinson
Atty.

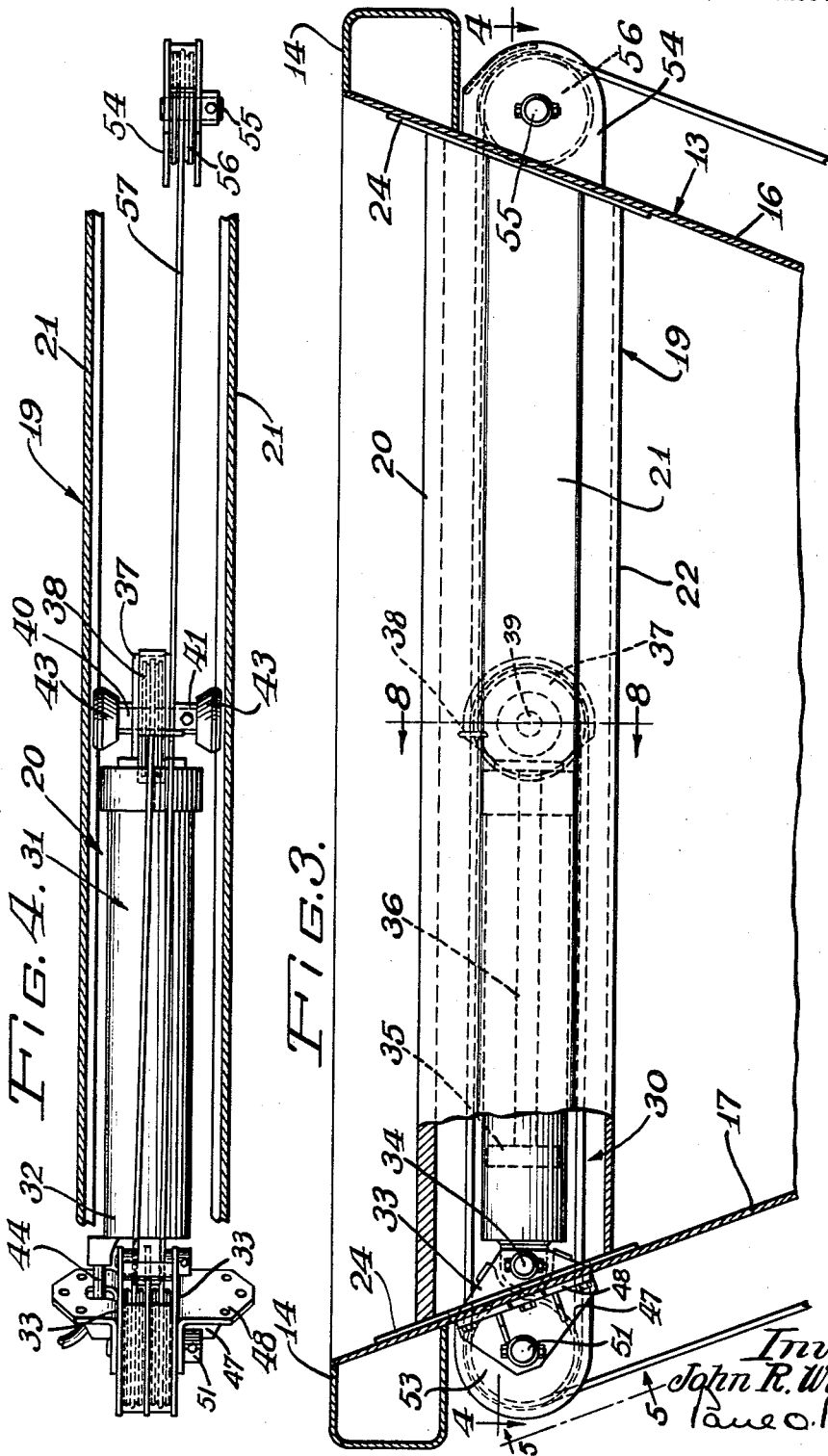

July 5, 1960  J. R. WILKINSON  2,943,886
DOOR OPENING MECHANISM FOR BOTTOM DUMP VEHICLES
Filed Jan. 16, 1957  4 Sheets-Sheet 3
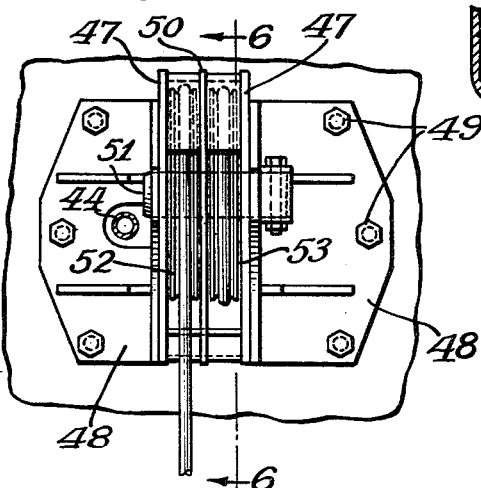
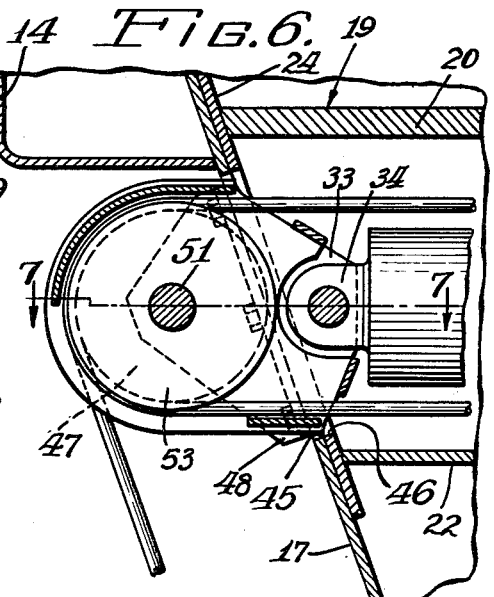
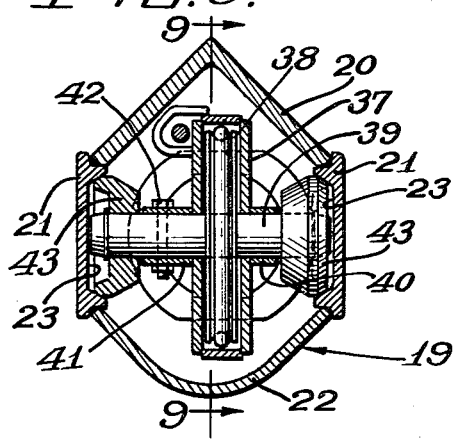
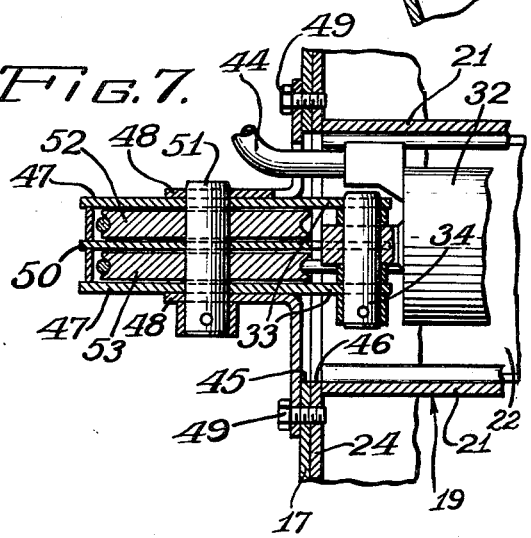
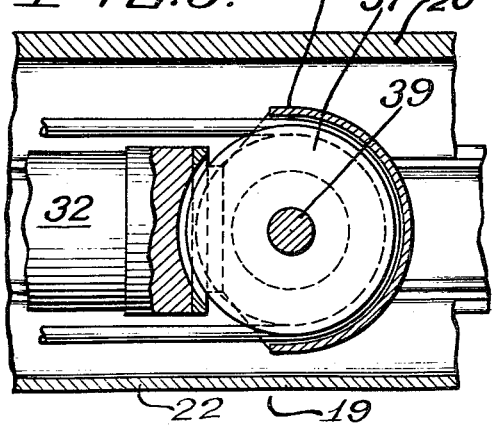
Inventor:
John R. Wilkinson July 5, 1960  J. R. WILKINSON  2,943,886
DOOR OPENING MECHANISM FOR BOTTOM DUMP VEHICLES
Filed Jan. 16, 1957  4 Sheets-Sheet 4

Inventor:
John R. Wilkinson
Paul O. Pippel
Atty.

United States Patent Office 2,943,886
Patented July 5, 1960

2,943,886
DOOR OPENING MECHANISM FOR BOTTOM DUMP VEHICLES

John R. Wilkinson, Mount Prospect, Ill., assignor to International Harvester Company, Chicago, Ill., a corporation of New Jersey Filed Jan. 16, 1957, Ser. No. 634,470

3 Claims. (Cl. 298—35)

This invention relates to bottom dump vehicles and more specifically it relates to an improved door opening mechanism for such vehicles.

A conventional type of dump wagon, or vehicle, consists essentially of a rear supporting structure on which a pair of rear ground wheels are mounted. The dump wagon includes a frame on which a material-receiving body is supported, the body having at its forward end a goose neck adapted to be connected to a tractor or similar vehicle. A pair of doors are hingedly connected to the body and in the closed position form the bottom partition on which the load is carried. In order to dump the material from the body, the doors are swung outwardly and upwardly thus permitting the material to be discharged through the lower end of the body. It is a prime object of this invention to provide an improved door opening mechanism for opening the doors of a bottom dump vehicle, the said mechanism being simple in construction and operation, inexpensive in manufacture, efficient, and substantially free of maintenance.

Still another object of this invention is to provide an improved door opening mechanism for opening the bottom doors of a dump wagon, the said mechanism being substantially disposed within the body, intermediate the ends thereof, whereby cables leading from the mechanism are connected to the dump doors substantially centrally thereof whereby power may be efficiently applied for opening and raising the said bottom dump doors.

A still further object is the provision of a door opening mechanism within the body of a bottom dump vehicle, the mechanism including a housing structure extending within the body of the vehicle, the said housing structure protecting the mechanism during operation.

A still further and more specific object is the provision of an improved door opening mechanism for bottom dump vehicles, the said mechanism being enclosed in a tubular member positioned substantially centrally within the body, the said mechanism including an extensible device suitably associated with cable mechanism connected to the bottom doors in a manner wherein power to open said doors can be most effectively applied.

These and further objects will become more readily apparent from a reading of the description when examined in connection with the accompanying sheets of drawings.

In the drawings:

Figure 3 is a cross-sectional view through the body of the dump wagon shown in Figure 1, the said view being taken substantially intermediate the front and rear ends of the body and having portions broken away to more effectively show a door opening mechanism;

Figure 4 is a cross-sectional view taken substantially along the line 4—4 of Figure 3;

Figure 5 is an enlarged detail of a sheave and sheave mounting means taken substantially along the line 5—5 of Figure 3;

Figure 6 is a sectional view of a sheave bracket mounting means and fluid extensible device connection taken substantially along the line 6—6 of Figure 5;

Figure 7 is a sectional view taken substantially along the line 7—7 of Figure 6;

Figure 8 is a sectional view of portions of a door opening mechanism, the said view being taken substantially along the line 8—8 of Figure 3;

Figure 9 is a cross-sectional view taken substantially along the line 9—9 of Figure 8.

Figure 1:
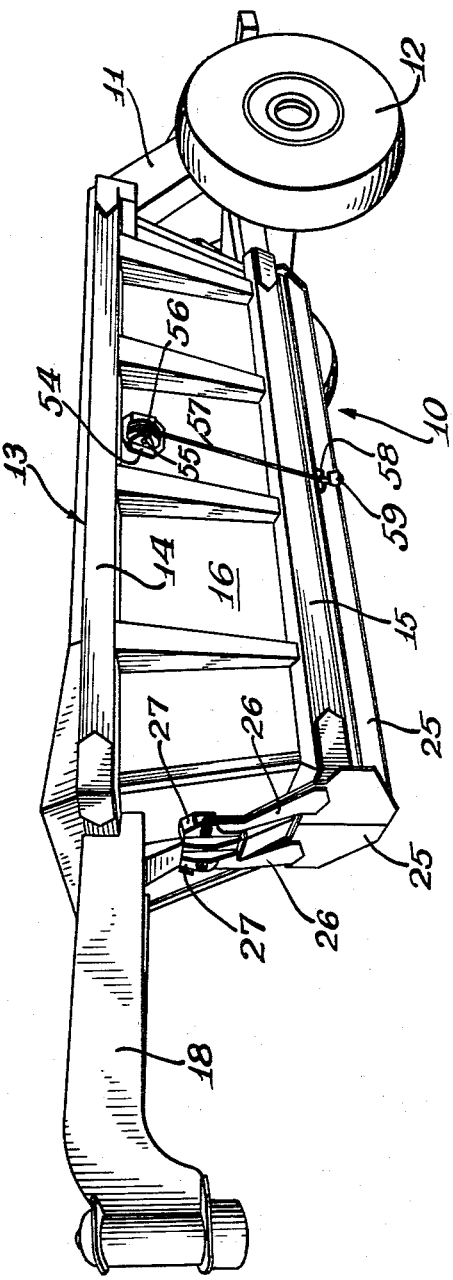
Figure 1 is a perspective view of a bottom dump vehicle incorporating an improved door opening mechanism.

A bottom dump wagon or vehicle is generally designated by the reference character 10, as shown in Figure 1. The bottom dump vehicle 10 may be of somewhat conventional construction consisting of a rear axle support 11 supported on rear ground wheels 12. The ground wheels 12 support a body 13 including longitudinally extending upper and lower frame members 14 and 15 respectively disposed on opposite sides of the vehicle 10. The body 13 also consists of downwardly and inwardly tapering side walls 16 and 17. A goose neck 18 is connected to the front end of the body 13, the said goose neck 18 being adapted to be connected to a suitable type of tractor or source of motive power.

A tubular member or casing, generally designated at 19, is positioned intermediate the front and rear ends of the body 13 and extends transversely with respect to said body. As best shown in Figure 8 the tubular member or casing 19 comprises a top angle 20 which is suitably supported on laterally spaced side beams 21 and a bottom plate 22 is connected to the side beams 21 to provide an enclosed tubular structure. The tubular member 19 and its elements thereof may be suitably connected together by welding, the manner in which these members are connected not being important in the present invention. The side beams 21 are recessed to provide guide elements or tracks 23 extending transversely and parallel to the axis of the tubular member 19. Opposite ends of the tubular member 19 are open, the said ends also being connected to mounting plates 24 which are suitably connected to the side walls 16 and 17.

The body 13 is also provided at its lower end with a pair of hinged closure members or bottom dump doors designated at 25. The dump doors 25 are provided at their forward and rearward ends with suitable hinge brackets 26 which cooperate with hinge members 27 suitably mounted on the front and rear ends of the body 13 so that the doors may be hinged outwardly and moved upwardly relative to the bottom of the body 13 whereupon any material within the body may be dumped. Like in conventional constructions the closure members 25 in the closed position provide a bottom for the body 13 on which the load is supported.

Referring now particularly to Figures 3 and 4, a closure actuating mechanism is generally referred to by the reference character 30. The closure actuating mechanism 30 comprises a power actuating means or fluid extensible device 31 which is positioned within the tubular member 19. The extensible device 31 comprises a fluid cylinder 32 suitably supported on a bracket 33 connected to the wall 17, the said fluid cylinder being secured to the bracket 33 by means of a pin 34. The cylinder 32 includes a reciprocating piston 35 connected to a rod or ram 36. The outer end of the ram 36 is suitably connected to a sheave bracket 37 having a guard 38. As best shown in Figures 8 and 9 the sheave bracket 37 supports a shaft 39. Spacer members 40 and 41 are provided on projecting ends of the shaft 39, the said spacer members being suitably connected to the sheave bracket 37. The shaft 39 is held against rotation by means of a pin 42 extending through the spacer 41. Laterally spaced guide means or rollers 43 are journalled on the shaft 39, the said rollers 43, as best shown in Figure 8, being held captive within and being adapted to roll upon the recessed tracks 23. Movement of the piston 35 is effectuated by fluid under pressure being directed through a conduit 44 which is in communication with the interior of the fluid cylinder 32.

As best shown in Figures 6 and 7 an opening 45 is provided in the wall 17, the said opening being in communication with the interior of the tubular member 19. Similarly the plate 24 is provided with such an opening so that access is had through the walls of the dump wagon with the interior of the tubular member 19. The wall 16 and its adjacent plate 24 is similarly provided with openings 45 and 46 so that the tubular member 19 opens outwardly on the opposite sides of the said body 13.

Referring now particularly to Figures 5, 6 and 7 the bracket 33 is provided with extensions projecting outwardly through the left-hand openings 45 and 46 to provide a pair of sheave bracket members 47. Angles 48 are suitably connected to the bracket members 47, the said angles also being supported on the side wall 17 by means of securing members 49. A separator 50 is disposed between the bracket members 47 and a shaft 51 is suitably supported on the bracket members 47 in said separator 50. The shaft has journalled thereon guides or sheaves 52 and 53.

Referring now particularly to Figures 1, 2, 3 and 4 a sheave bracket 54 is suitably supported on the side walls 16 immediately adjacent one of the open ends of the tubular member 19. A shaft 55 is supported on the sheave bracket 54, the said shaft having journaled thereon a guide or sheave 56. A flexible member or cable is generally designated at 57 and this cable 57 includes ends 58 which are suitably connected to the closure members 25 by means of a connector 59. Such a connector 59 is shown in Figure 1, the other connector on the other side of the vehicle being identical and both ends 58 thus being securely fastened to the closure members 25 substantially intermediate the front and rear ends thereof.

Figure 2:
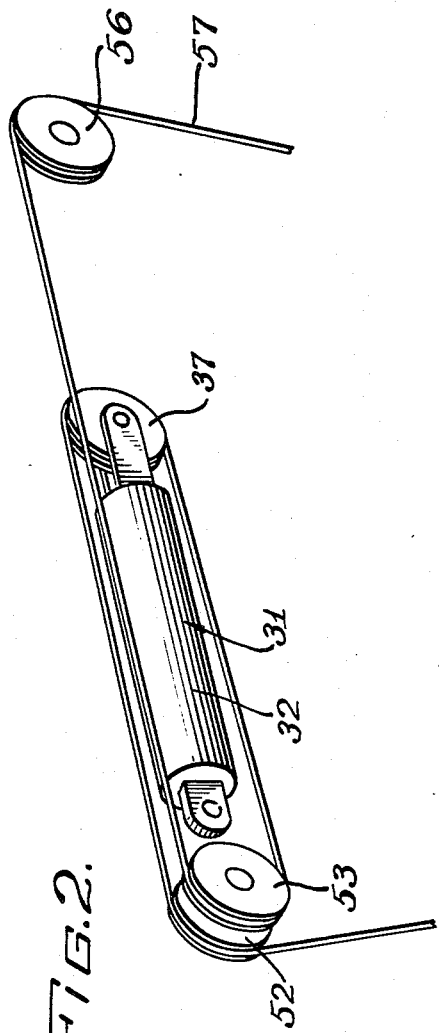
Figure 2 is a schematic view of an improved door opening mechanism including the cable reaving arrangement therefor.
Figure 10:
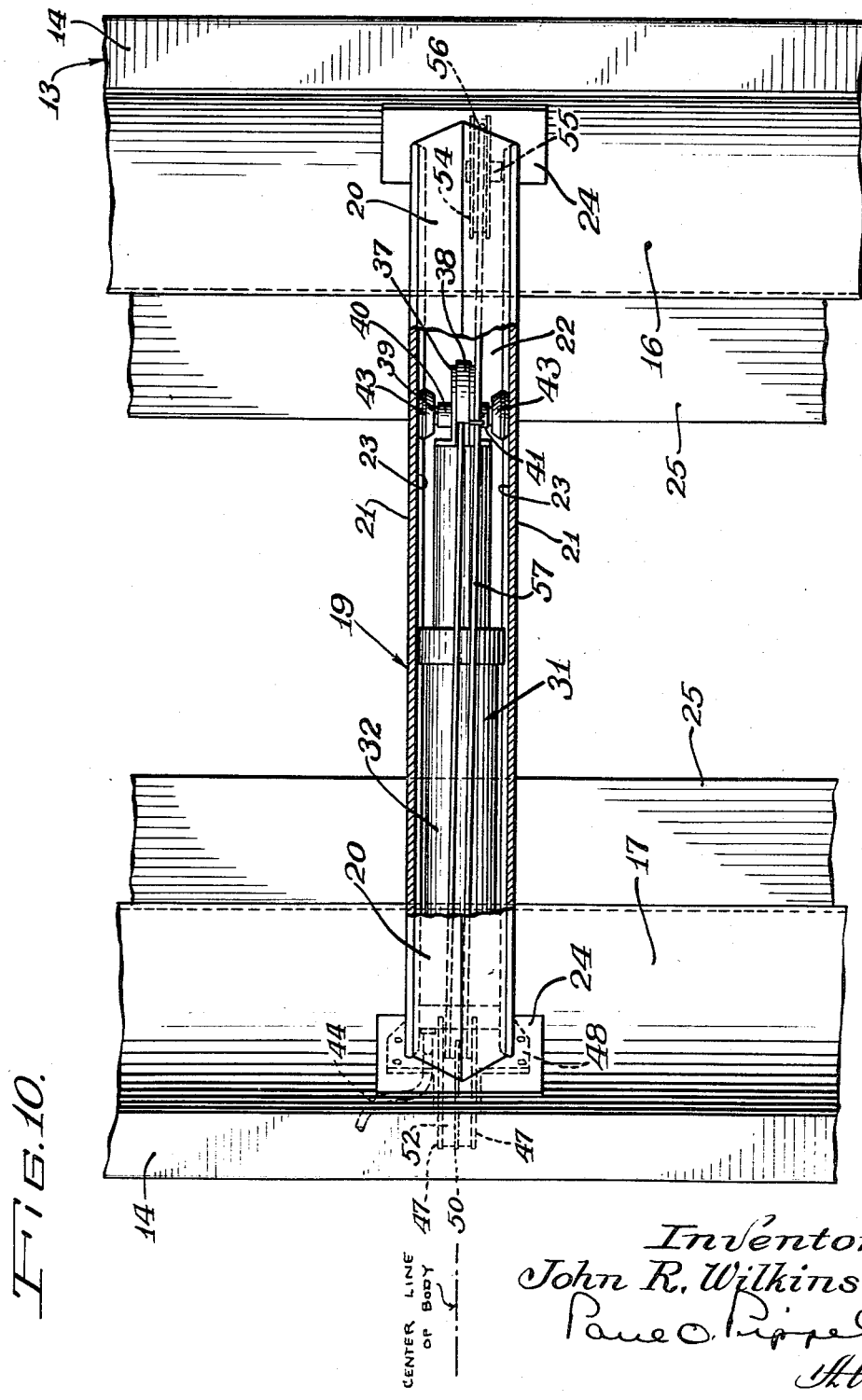
Figure 10 is a plan view, partially in section, of a portion of the body showing the door opening mechanism in operation to open the doors partially.

Figure 2 shows a schematic view of the reeving arrangement of the cable 57. The ends 58 have been connected as previously indicated to the closure members and by examining Figure 2 it is seen that the cable extends upwardly from one side of the body over the sheave 52 around the sheave 38, around the sheave 53, over the sheave 56 and thence downwardly to its point of connection to the closure member.

In the operation, fluid under pressure is supplied through the conduit 44 to the cylinder 32 whereupon the piston 35, as shown in Figure 3, moves to the right. As it moves to the right the sheave 38 is also moved to the right and tension is applied to the cable by virtue of the receiving arrangement whereupon the ends 58 of the cable 57 are moved in a direction upwardly thus swinging the doors outwardly and upwardly on its hinged members thereby effectively opening the doors to permit dumping of the material through the bottom of the body.

It can be seen that this closure opening mechanism is of extremely simple construction and the doors immediately fall to a closed position upon slackening of the cable 57 when the piston 35 is moved to its original non-operating position. It can also be seen that the location of the door opening mechanism is ideal since it is centrally located so that the cable connections are directly at the central point of the doors and thus power is effectively applied in an even manner for positively opening of said doors. It is also apparent that the only access to the interior of the tubular member is through the sides of the body through the openings adjacent the various sheaves. In other words the interior of the tubular member, which contains the effective working elements, is completely sealed from the interior of the body and thus no foreign matter can enter into the working parts of the door raising mechanism. The rollers 43 effectively maintain the fluid cylinder in effective alignment within the tubular member and opening of the doors can be accomplished with ease and speed whenever desired. Thus it is apparent that the objects of the invention have been fully achieved and it must be understood that changes and modifications may be made without departing from the spirit of the invention or the scope thereof as defined in the appended claims.

What is claimed is:

1. In a bottom dump vehicle having opposite sides defining a material receiving body and a pair of bottom closure members means hingedly connecting said closure members to said body about hinge axes spaced upwardly from said closure members, said hinge axes extending longitudinally with said body, and said closure members being movable laterally outwardly with respect to said hinge axes, a tubular housing extending transversely and supported within said body, said housing having opposed open ends, said sides having oppositely disposed openings, means supporting said housing within said body with the open ends of said housing registering with said oppositely disposed openings; a closure actuating mechanism including a fluid cylinder, means securing said cylinder within said housing adjacent one of said sides, a ram positioned for reciprocation within said cylinder, said ram being movable in said housing in a direction transversely with respect to said body, a guide member on said ram movable therewith, guide means supported within said housing, said guide means being engaged by said member during movement of said ram, a first sheave connected to said body adjacent one of the openings of one of said sides, a second sheave connected to said ram for movement therewith, a third and fourth sheave secured on said body adjacent the other opening in said other side adjacent said securing means, said second sheave being positioned between said first sheave and said third and fourth sheaves, a flexible member having first and second ends, means connecting one end to one of said closure members which is disposed on the same side as and below said first sheave, said flexible member extending upwardly over said first sheave, to and around said third sheave, to and around said second sheave, to and over said fourth sheave and downwardly, and means connecting said second end to said other closure member which is disposed on the same side as and below said third and fourth sheaves, whereby upon movement of said ram and said second sheave in a direction toward said first sheave, the ends of said flexible member are moved upwardly and said closure members are moved to an open position.

2. In a bottom dump vehicle having opposite sides defining a material receiving body and a pair of bottom closure members, means higedly connecting said closure members to said body about hinge axes spaced upwardly from said closure members, said hinge axes extending longitudinally with said body, and said closure members being movable laterally outwardly with respect to said hinge axes, a tubular housing extending transversely and supported within said body, said housing having opposed open ends, said sides having oppositely disposed openings, means supporting said housing within said body with the open ends of said housing registering with said oppositely disposed openings; a closure actuating mechanism including a fluid cylinder, means securing said cylinder within said housing adjacent one of said sides, a ram positioned for reciprocation within said cylinder, said ram being movable in said housing in a direction transversely with respect to said body, a first sheave connected to said body adjacent one of the openings of said sides, a second sheave connected to said ram for movement therewith, a third and fourth sheave secured on said body adjacent the other opening in said other side and adjacent said securing means, said second sheave being positioned between said first sheave and said third and fourth sheaves, a flexible member having first and second ends, means connecting one end to one of said closure members which is disposed on the same side as and below said first sheave, said flexible member extending upwardly over said first sheave, to and around said third sheave, to and around said second sheave, to and over said fourth sheave and downwardly, and means connecting said second end to said other closure member which is disposed on the same side as and below said third and fourth sheaves, whereby upon movement of said ram and said second sheave in a direction toward said first sheave, the ends of said flexible member are moved upwardly and said closure members are moved to an open position.

3. In a bottom dump vehicle having opposite sides defining a material receiving body, a pair of bottom closure members, means hingedly connecting said closure members to said body about hinge axes spaced upwardly from said closure members, said hinge axes extending longitudinally with said body, said closure members being movable laterally outwardly with respect to said hinge axes to an open position, a tubular housing having opposed open ends extending transversely within said body, said sides having oppositely disposed openings, means connecting said tubular member to said body with said open ends registering with said openings, a power actuating means secured within said housing and including a member movable within said housing and transversely with respect said said body, cable guide means secured within said housing adjacent said openings, a cable connected to said movable member, said cable extending from said movable member over said guide means and through said openings and outwardly of said body, said cable having opposite ends, one cable end being connected to one closure member which is positioned below the side having one opening, the other cable end being connected to the other closure member which is positioned below the other side having said other opening, and means for moving said movable member whereby said cable ends are moved upwardly toward said openings and said closure members are opened.

References Cited in the file of this patent

UNITED STATES PATENTS

| Re. 13,362 | Christianson | Jan. 16, 1912 |
| 378,272 | Watson | Feb. 21, 1888 |
| 387,415 | Hewlett | Aug. 7, 1888 |
| 700,767 | Hart | May 27, 1902 |
| 714,286 | Day | Nov. 25, 1902 |
| 722,299 | Hansen | Mar. 10, 1903 |
| 773,093 | McKnight | Oct. 25, 1904 |
| 933,034 | Hanson | Aug. 31, 1909 |
| 2,237,299 | Benbow et al. | Apr. 8, 1941 |
| 2,524,122 | Dick | Oct. 3, 1950 |
| 2,760,816 | Kling | Aug. 28, 1956 |

FOREIGN PATENTS

| 907 | Great Britain | Sept. 24, 1869 |